March 27, 1956  R. C. RUSSELL  2,739,491
MECHANICAL MOVEMENT DEVICE
Filed Sept. 13, 1952  2 Sheets-Sheet 1
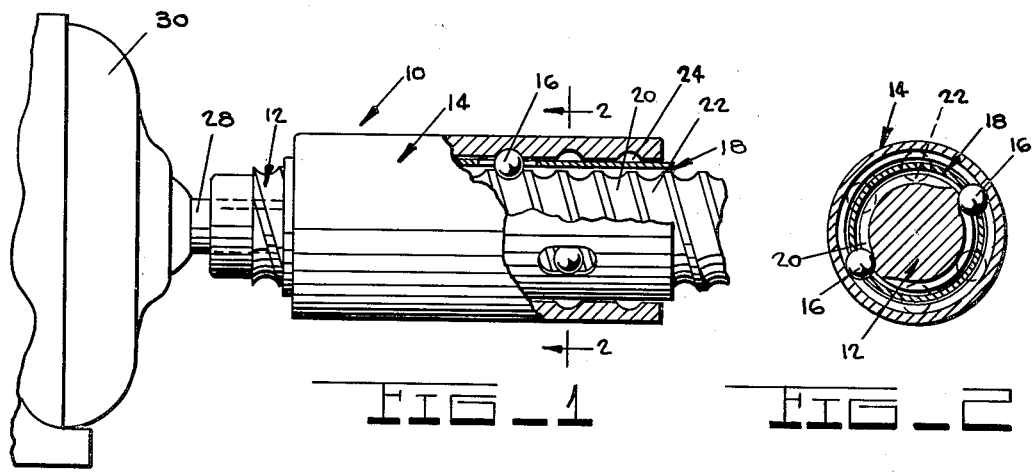
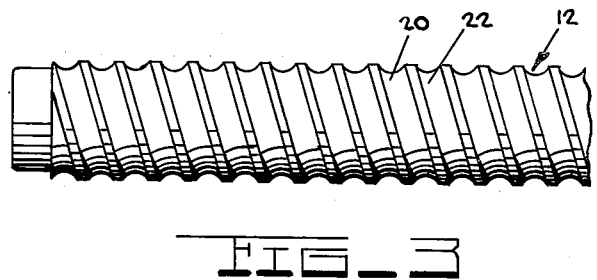
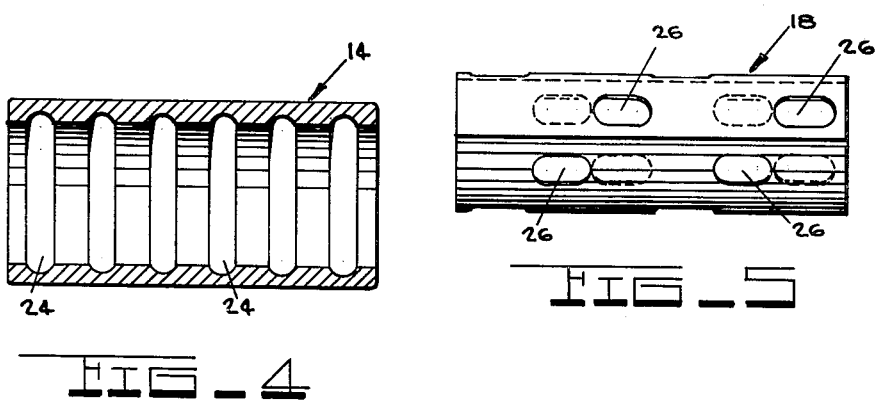
INVENTOR.
ROBERT C. RUSSELL
BY
*McDonald & Feagns*
ATTORNEYS

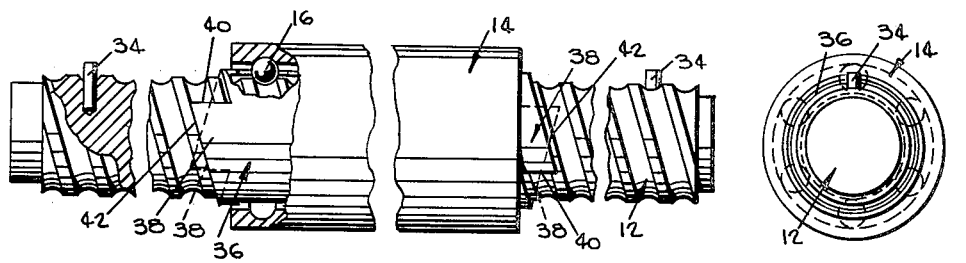
FIG_6  FIG_7
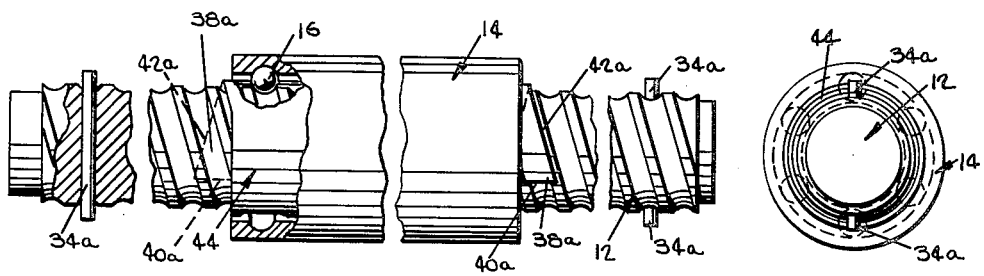
FIG_8  FIG_9
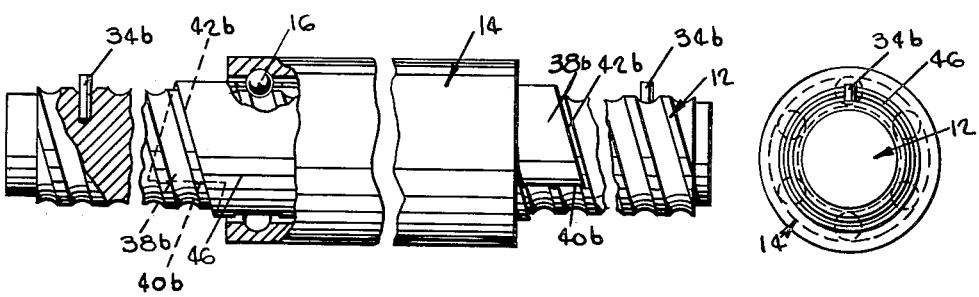
FIG_10  FIG_11
INVENTOR.
ROBERT C. RUSSELL
BY
ATTORNEYS

United States Patent Office 2,739,491
Patented Mar. 27, 1956

2,739,491

MECHANICAL MOVEMENT DEVICE

Robert C. Russell, South Euclid, Ohio, assignor to Eaton Manufacturing Company, Cleveland, Ohio, a corporation of Ohio Application September 13, 1952, Serial No. 309,469

12 Claims. (Cl. 74—459)

This invention relates to change speed mechanical movement devices and more particularly to improvements in construction of the type of ball interconnected nut and screw devices disclosed by my Patent No. 2,446,393.

Broadly the invention comprehends the provision of a change speed mechanical movement device including one member having a single or multiple lead thread on a peripheral surface thereof providing one or more helical grooves, a second member concentric to the first member having one or more circumferential grooves in a peripheral surface thereof in radial opposed relation to the helical groove or grooves in the first member, a plurality of balls seated simultaneously in the grooves of both members positioned radially between the members, and a ball retainer or cage is arranged concentrically between the members, operatively engaging said balls and maintaining said balls in predetermined spaced relation with respect to one another. A change speed mechanical advantage is obtained from the device through the driving of either one or the other of the members thereof. An economical structure is herein provided through the rolling of the helical grooves in the one member and the manufacturing of the ball retainer or cage from sheet stock metal which is appropriately stamped with apertures for receiving the balls therein and formed to cylindrical shape for concentric positioning between the members with the balls therein.

In view of the adoption of automatic mechanisms for the operation of various heretofore manually operated apparatus of automotive vehicles such as windows, seats, etc., it has become necessary to employ efficient and economical mechanical movement means for transmitting motion from a power means to the apparatus to be actuated. With the known commercial acceptance of ball interconnected nut and screw devices of the type disclosed by my Patent No. 2,446,393 as mechanical movement means, it is only logical that they should be applicable to the aforesaid automatic mechanisms. Furthermore because of the principle of operation of these devices they lend themselves to economical construction while retaining efficiency of operation and thus are suited to mass production techniques of the automotive industry.

Among the objects of the invention is the provision of a mechanical movement device, that;

(a) Is highly efficient and economical to manufacture;

(b) Can be mass production manufactured without maintenance of close tolerance; and (c) Includes rolled helical grooves and opposed circumferential grooves on cooperative members, balls simultaneously seated in both grooves and a slotted cage arranged concentrically between the members for fixing the circumferential spaced relation of the balls while permitting axial movement thereof.

Other objects and advantages of the invention will appear from the following description taken in connection with the drawings forming a part of the specification; and in which:

Fig. 1 is a side elevation partly fragmentary and partly broken away sectionalized view of a motor driven ball-screw-nut mechanical movement device;

Fig. 2 is a cross-sectional view taken substantially along lines 2—2 of Fig. 1;

Fig. 3 is a fragmentary view of the screw of Fig. 1;

Fig. 4 is a cross-sectional view of the nut of Fig. 1;

Fig. 5 is a view of the ball cage of Fig. 1;

Fig. 6 is a fragmentary view of a modified structure of Fig. 1;

Fig. 7 is an end elevation view of Fig. 6;

Fig. 8 is a fragmentary partly broken away and cross-sectionalized view of a modified structure of Fig. 6;

Fig. 9 is an end elevation view of Fig. 8;

Fig. 10 is a fragmentary partly broken away and cross-sectionalized view of a further modified structure of Fig. 6; and Fig. 11 is an end elevation view of Fig. 10.

Similar reference characters indicate corresponding parts throughout the several views of the drawings.

Referring to the drawings for more specific details of the invention 10 represents generally a mechanical movement device comprising a screw 12, a nut 14, a plurality of balls 16 and a ball retainer or cage 18.

Screw 12 has a double lead helical thread therein formed by rolling helical grooves 20 and 22 in the cylindrical surface thereof. Grooves 20 and 22 are of partially circular cross-sectional configuration and of substantially constant pitch throughout the length of the screw.

Nut 14 is provided in its base with a plurality of preferably equally axially spaced circumferential grooves 24, said grooves being of the same cross-sectional configuration as the grooves 20 and 22 in the screw 12. These grooves are to be formed by a form cutting tool or other appropriate means.

The cage 18 is preferably made of sheet metal stock which is curved to cylindrical tubular form as shown by Fig. 5 and is provided with predetermined circumferentially spaced elongated slots 26 extending radially therethrough. The slots 26 are preferably formed therein in the original blanking operation and are of a width only slightly larger than the diameter of the balls and wherein the portions of the cage constituting the sides of the slot confine the balls to the established predetermined spacing thereof. The length of the slots are appreciably of greater size than the diameter of the balls, the purpose of which will hereinafter appear.

The balls 16 as shown by Figs. 1 and 2 are received in the slots in the cage and are simultaneously seated in the grooves of the nut and screw radially therebetween with the cage concentrically disposed between the nut and screw serving to position and maintain the balls in operative spaced relation.

The rolling of the grooves 20 and 22 and the manufacture of the cage 18 from flat metal stock lend themselves to the commercial production of device 10. In so providing for economy of construction inaccuracy might result wherein the pitch of the helical grooves may be out of phase to one another and the centers of the slots may vary slightly. As a means of compensating for these possible inaccuracies while at the same time assuring high efficiency of operation of the device the elongated slots 26 permit the balls to position themselves relative to the grooves of the nut and screw so as to be properly centrally seated therein and thus eliminate the necessity of close tolerance manufacture. At the same time, the portions of the cage constituting the sides adjacent the slots confine the balls in circumferentially spaced relation so that an effective and highly efficient planetary action is simulated with the screw as the sun gear, the nut as the ring gear, the balls as planets, and the cage as the planets support. Without the provision of the elongated slots 26 and with inaccuracy in the formation of the helical grooves as a result of the rolling thereof a predetermined confinement of the balls both circumferentially and axially a binding of the balls between the circumferential and helical grooved nut and screw would result and thus cause inefficient operation of the device.

Although the necessity for the provision of the elongated slots 26 is more pronounced for double or greater plural lead threaded members having rolled grooves it is applicable for use with single lead rolled helical grooved members to account for inaccuracies therein or for machining inaccuracies of grooves formed by means other than rolling.

In so providing the screw 12 having a double or greater plural lead thread a greater number of balls can be used, with the number of balls in each circumferential groove corresponding with the plural nature of the helical grooved member. As such a more effective distribution of load can be accomplished resulting in a greater load carrying capacity for a given size device while at the same time providing a more stable device which can operate effectively even without direct axial thrust loading thereof.

As shown by Fig. 1, screw 12 is rigidly secured to the output shaft 28 of an electric motor 30 serving as a rotary source of power for rotating the screw. With rotation imparted to screw 12, a planetary operation is initiated wherein with the balls engageable between the grooves of the screw and nut and with the nut connected to an element, not shown, to be actuated thereby, resisting rotation of the nut, the nut is moved axially relative to the screw. The lineal axial speed of the nut depends on the corresponding diameter of the balls and the diameter of the helical and circumferential grooves of the respective screw and nut as well as the angle of the helical grooves.

Fig. 6 illustrates a modified device 32 from that of Fig. 1 primarily in providing for freewheeling of the nut and screw relative to one another when the nut reaches the predetermined desired end limits of its axial travel on the screw. This structure is likened generally to the structure disclosed and claimed in my Patent 2,466,393 but with improvement thereover.

By comparison with device 10, device 32 differs therefrom in two material aspects, that is the provision of pins 34 located at desired positions on screw 12 extending radially outwardly of the grooved passage of the screw on axially opposite sides of nut 14 and a cage 36 having a pair of ears 38 extending axially beyond each end thereof adapted for engagement with the pins 34. Each of the ears 38 is bounded by an axially directed wall or surface 40 and an adjoining end angular wall or surface 42. Walls 40 serve as stop faces adapted to engage the pins 34 whereas the surfaces 42 are preferably of a helix or pitch equal to or slightly greater than the helix or pitch of the helical grooves of the screw. In so making surfaces 42 of a pitch equal to or slightly greater than the pitch of the helical grooves of the screw, it is not possible for said surfaces to abut the pins and tend to jam axially thereagainst. As such assurance is always had for the abutment of the pins on the stop faces or axially directed walls 40 of the cage 36. As noted the walls 40 of the respective ears 38 are spaced 180° apart for the reason that for each revolution of the screw, the cage 36 and nut 14 advance axially a distance equal to the lead of grooves 20 and 22. By so providing two ears 38 on each end of cage 36 either one or the other will have its stop surface 40 engage the respective pin 34 after a relative rotation between the cage and screw of 180° once the axial outermost point of the helix surface 42 of one ear 38 is adjacent pin 34.

Fig. 7 illustrates an equally effective freewheeling arrangement as that of Fig. 6 wherein cage 44 is provided with only one ear 38a, at each end of the cage, bounded by an axially directed wall 40a and an adjoining end angular wall 42a, having a helix or pitch equal to or slightly greater than the helix or pitch of helical grooved screw 12. In using the single ear 38a at each end of the cage it is necessary to either use two pins 34a, on opposite axial sides of the cage, spaced 180° apart and protruding radially outwardly beyond the grooved surface of the screw or one pin extending radially through the screw having 180° apart ends. Similarly to the operation of cage 36 and pins 34, the ear 38a on one end of cage 44 is adaptable to have its axially directed wall or stop surface 40a abut either of the 180° apart pins 34a whereas end wall 42a will avoid engagement with either of the pins 34a. If as the cage moves axially on screw 12, the axial outermost point on wall 42a moves adjacent to one of the pins 34a, a further relative rotation of the screw to the cage, of 180° will bring the wall 40a into engagement with the other pin 34a. As noted from Fig. 7, it is only necessary that the angular wall 42a extend around 180° of the circumference of the cage and merges with a partial annular end wall 43, of the cage, extending the remaining 180° of the circumference of the cage.

As a further modification of the structures of Figs. 6 and 7, Fig. 8 illustrates the provision of solely one ear 38b on each end of a cage 46 and one pin 34b on axial opposite sides of the cage. In so providing one ear 38b it is necessary to provide the axial end wall 42b thereof of a helix or pitch equal to or slightly greater than the helix or pitch of the grooves 20 and 22 of screw 12 extending around the entire circumference of the cage and as such a stop surface or axially directed wall 40b substantially twice as long as either of the walls 40 or 40a is had. With only one pin 34b and the stop surface 40b and 42b the screw 12 can be rotated through one complete revolution once the axial outermost point of end surface 42b comes adjacent the stop 34b without engagement occurring between the end surface 42b and the stop.

In so making the ears 38, 38a and 38b having end angular walls 42, 42a and 42b wherein they have a helix equal to or slightly greater than the helix of grooves 20 and 22, not only is interference avoided between the pins 34, 34a and 34b and said walls, but the ears as such are of substantially greatest strength so that the continued engagement of the walls 40, 40a and 40b with the pins will not cause said ears to be sheared from the cages.

Through insuring the engagement of the axially directed walls of the cages of Figs. 6, 7 and 8 against the stop pins therefor no wedging of the cage to the screw is possible thereby providing for a quick and easy relative axial reversal of movement between the cage and screw upon reversal of rotation of the nut once the cage and nut are moved to one axial limit on the screw.

Inasmuch as the cages of the respective structures of Figs. 6, 7 and 8 control the position of all of the balls held thereby between the screw and nuts, it will be appreciated that if the cage is locked against rotation with respect to the screw at any relative position of the screw and nut, the balls will be stopped from further movement in the grooves 16 and 18 of the screw. Under these conditions if relative rotation between the nut and screw is continued the balls will simply roll around in the grooves 24 of the nut 14 and a freewheeling action is provided.

The ears 38, 38a and 38b in being formed on the cages 36, 44 and 46, can, in the construction of said cages of sheet metal stock, be blanked out at the time of the stamping manufacture of the cages to size and shape with slots 26 therein. As such a very simple and economical ball retainer or cage is had.

Although this mechanical movement device has been defined and disclosed in terms of specific screw and nut devices, it is readily conceivable that the members thereof can be altered both in form and as to reversal of parts without departing from the basic principle evolved. Accordingly, the invention is to be interpreted in the light of the appended claims and the basic premise presented.

What I claim is:

1. A mechanical movement device comprising a member having a plurality of like axially spaced circumferential grooves in a peripheral surface thereof, a second member having a plurality of helical grooves in a peripheral surface thereof in radially opposed relation to the grooves in the other member, a plurality of balls seated in the grooves of the members radially between the members, and a cage, interposed concentrically between the members, having a plurality of like circumferentially and axially spaced slots therethrough having a length appreciably larger than the diameter of the balls and operative to receive one ball in each slot and maintain the balls in spaced relation to each other and in free floating driving position between the grooves of the respective members whereby jamming or binding of the members and balls as a unit is prevented by reason of the balls becoming locked together with the cage and members as a unit.

2. A mechanical movement device comprising a member having a plurality of like axially spaced circumferential grooves in a peripheral surface thereof, a second member having a plurality of rolled helical grooves in a peripheral surface thereof in radially opposed relation to the grooves in the other member, a plurality of balls seated in the grooves, with the number of balls in each circumferential groove corresponding to the number of helical grooves in the helically grooved member, and a cage, interposed concentrically between the members, having a plurality of circumferentially and axially spaced elongated slots extending radially therethrough corresponding in number to the number of balls seated in the grooves of the members, operative to receive one ball in each slot, for operatively engaging said balls and maintaining them in spaced relation to each other and free from binding position between the members upon a power transmitting operation of the device by reason of the balls becoming locked together with the cage and members as a unit.

3. A mechanical movement device comprising a member having a plurality of like axially spaced circumferential grooves in a peripheral surface thereof, a second member having a plurality of helical grooves in a peripheral surface thereof in radially opposed relation to the grooves in the other member, a plurality of balls seated in the grooves of the members radially between the members, and a cage, interposed concentrically between the members, having a plurality of axially extended circumferentially and axially spaced slots extending radially therethrough with one ball received in each slot and being confined to rotation and permissible axial movement in said slots, said slots and balls for any one circumferential groove in the first member being circumferentially spaced apart by an amount equal to 360° divided by the number of helical grooves in the second member by reason of the balls becoming locked together with the cage and members as a unit.

4. A mechanical movement device comprising a member having a plurality of like axially spaced circumferential grooves in a peripheral surface thereof, a second member having a helical groove in a peripheral surface thereof in radially opposed relation to the circumferential grooves, means on the helical grooved member extending radially beyond the peripheral surface thereof, a cylindrical cage, interposed concentrically between the members, having a plurality of circumferentially and axially spaced slots radially therethrough and means on an end of the cage engageable with the means on the helical grooved member, said slots being axially extended a length greater than the width thereof, whereby the cage can locate itself properly to the positions of the balls in the circumferential grooves and thus prevent any possible binding of the balls with the cage between the circumferential and helical grooved members and a plurality of balls, only one received in each slot of the cage and simultaneously seated in the grooves of the members radially therebetween, each having a diameter substantially equal to the width of the slot in which it is received, said means on the cage including an axially extended ear bounded by an axially directed wall and an adjoining end angular wall having a helix or pitch equal to or slightly greater than the helix or pitch of the helical groove, and wherein said means on the screw includes a member with which the axially extended wall of the cage is engageable.

5. A device according to claim 4 wherein the cage is a sheet stock material member.

6. A mechanical movement device comprising a member having a plurality of like axially spaced circumferential grooves in a peripheral surface thereof, a second member having a plurality of helical grooves in a peripheral surface thereof in radially opposed relation to the circumferential grooves, a cylindrical cage, interposed concentrically between the members, having a plurality of circumferentially and axially spaced slots radially therethrough and a plurality of like axially extended and equicircumferentially spaced ears on one end equal in number to the plurality of helical grooves, each bounded by an axially directed wall and an end adjoining angular wall having a helix or pitch equal to or slightly greater than the helix or pitch of the helical grooves, said slots being axially extended of a length greater than the width thereof, a plurality of balls, only one received in each slot of the cage and simultaneously seated in the grooves of the members radially therebetween, each having a diameter substantially equal to the width of the slot in which it is received, and a member on the helical grooved member engageable with the axially directed wall of one of the ears.

7. A device according to claim 6, wherein the helical grooves and ears are both two in number.

8. A mechanical movement device comprising a member having a plurality of like axially spaced circumferential grooves in a peripheral surface thereof, a second member having a plurality of helical grooves in a peripheral surface thereof in radially opposed relation to the circumferential grooves, a cylindrical cage, interposed concentrically between the members, having a plurality of circumferentially and axially spaced slots radially therethrough and an axially extended ear on one end thereof bounded by an axially directed wall and an adjoining end angular wall having a helix or pitch equal to or greater than the helix or pitch of the helical grooves, said slots being axially extended of a length greater than the width thereof, a plurality of balls, only one received in each slot of the cage and simultaneously seated in the grooves of the members radially therebetween, each having a diameter substantially equal to the width of the slot in which it is received and means secured to the helical grooved member engageable with the axially directed wall of the ear.

9. A device according to claim 8, wherein the means includes two members radially protruding from the helical grooved member beyond the peripheral surface thereof circumferentially spaced 180° apart and lying in a plane perpendicular to the axis of the helical grooved member.

10. A mechanical movement device comprising a member having a plurality of like axially spaced circumferential grooves in a peripheral surface thereof, a second member having a plurality of helical grooves in a peripheral surface thereof in radially opposed relation to the circumferential grooves, a cylindrical cage, interposed concentrically between the members, having a plurality of circumferential and axially spaced slots radially therethrough and a plurality of like axially extended and equicircumferentially spaced ears on one end equal in number to the plurality of helical grooves, each bounded by an axially directed wall and an end adjoining angular wall having a helix or pitch equal to or slightly greater than the helix or pitch of the helical grooves, a plurality of balls, only one received in each slot of the cage and simultaneously seated in the grooves of the members radially therebetween, and a member on the helical grooved member engageable with the axially directed wall of one of the ears.

11. A mechanical movement device comprising a member having a plurality of like axially spaced circumferential grooves in a peripheral surface thereof, a second member having a plurality of helical grooves in a peripheral surface thereof in radially opposed relation to the circumferential grooves, a cylindrical cage, interposed concentrically between the members, having a plurality of circumferentially and axially spaced slots radially therethrough and an axially extended ear on one end thereof bounded by an axially directed wall and an adjoining end angular wall having a helix or pitch equal to or greater than the helix or pitch of the helical grooves, a plurality of balls, only one received in each slot of the cage and simultaneously seated in the grooves of the members radially therebetween, and means secured to the helical grooved member engageable with the axially directed wall of the ear.

12. A mechanical movement device according to claim 11 wherein the cage is a split sheet stock member.

References Cited in the file of this patent

UNITED STATES PATENTS

| | | |
|---|---|---|
| 2,446,393 | Russell | Aug. 3, 1948 |
| 2,462,779 | Russell | Feb. 22, 1949 |

FOREIGN PATENTS

| | | |
|---|---|---|
| 139,400 | Switzerland | Apr. 15, 1930 |